United States Patent
Monna et al.

(10) Patent No.: US 11,722,080 B2
(45) Date of Patent: Aug. 8, 2023

(54) VEHICLE

(71) Applicants: TOYOTA JIDOSHA KABUSHIKI KAISHA, Toyota (JP); SUBARU CORPORATION, Tokyo (JP)

(72) Inventors: Hiroshi Monna, Toyota (JP); Shinichiro Noda, Toyota (JP); Junichi Murase, Aichi-ken (JP); Takuya Horie, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/551,639

(22) Filed: Dec. 15, 2021

(65) Prior Publication Data
US 2022/0200496 A1    Jun. 23, 2022

(30) Foreign Application Priority Data
Dec. 23, 2020   (JP) .................................. 2020-214090

(51) Int. Cl.
*H02P 21/14* (2016.01)
*B60L 15/20* (2006.01)
*B60K 1/02* (2006.01)

(52) U.S. Cl.
CPC ............. *H02P 21/14* (2013.01); *B60L 15/20* (2013.01); *B60K 1/02* (2013.01); *B60L 2240/423* (2013.01)

(58) Field of Classification Search
CPC .......... H02P 21/14; H02P 23/04; H02P 21/05; B60L 15/20; B60L 2240/423; B62D 5/0472
See application file for complete search history.

(56) References Cited

U.S. PATENT DOCUMENTS

| | | | |
|---|---|---|---|
| 9,764,758 B2 * | 9/2017 | Akatsuka | B62D 5/0472 |
| 2006/0076914 A1 * | 4/2006 | Yaguchi | H02P 25/098 318/432 |
| 2009/0000857 A1 * | 1/2009 | Sugiyama | B62D 5/0463 180/444 |
| 2017/0001660 A1 * | 1/2017 | Chiba | B62D 5/0472 |

(Continued)

FOREIGN PATENT DOCUMENTS

| | | | |
|---|---|---|---|
| EP | 1646137 A2 * | 4/2006 | H02P 25/098 |
| JP | 2002-078110 A | 3/2002 | |

(Continued)

*Primary Examiner* — Bickey Dhakal
(74) *Attorney, Agent, or Firm* — Dinsmore & Shohl LLP (57) ABSTRACT

A vehicle includes a main motor for traveling and an electronic control unit that controls the main motor. The electronic control unit is configured to: extract, from time series data of a rotation speed of the main motor, vibration data in a predetermined frequency band that includes resonance frequency of a drive system that includes the main motor; lower an upper limit value of output torque of the main motor from a normal upper limit value to a first upper limit value lower than the normal upper limit value when magnitude of vibration obtained from the extracted vibration data exceeds a first threshold value; and lower the upper limit value of output torque of the main motor to a second upper limit value lower than the first upper limit value when the magnitude of the vibration exceeds a second threshold value larger than the first threshold value.

6 Claims, 4 Drawing Sheets

(56) References Cited

U.S. PATENT DOCUMENTS

| | | | |
|---|---|---|---|
| 2017/0072805 A1* | 3/2017 | Cho | B60L 58/15 |
| 2020/0313594 A1* | 10/2020 | Lan | H02P 23/20 |
| 2020/0331454 A1* | 10/2020 | An | G01M 15/12 |

FOREIGN PATENT DOCUMENTS

| | | |
|---|---|---|
| JP | 2006-115644 A | 4/2006 |
| JP | 2006-148991 A | 6/2006 |
| JP | 2009-035191 A | 2/2009 |
| JP | 2011-097826 A | 5/2011 |
| JP | 2018-024278 A | 2/2018 |
| JP | 2020-171067 A | 10/2020 |
| JP | 2022-081327 A | 5/2022 |

* cited by examiner

VEHICLE

CROSS-REFERENCE TO RELATED APPLICATION

This application claims priority to Japanese Patent Application No. 2020-214090 filed on Dec. 23, 2020, incorporated herein by reference in its entirety.

BACKGROUND

1. Technical Field

The technique disclosed in the present specification relates to a vehicle that includes a motor for traveling.

2. Description of Related Art

The vehicle vibrates while traveling. In particular, when frequency of a load received from a road surface is close to resonance frequency of a vehicle body, vibration of the vehicle body increases. For example, Japanese Unexamined Patent Application Publication No. 2018-24278 (JP 2018-24278 A) and Japanese Unexamined Patent Application Publication No. 2020-171067 (JP 2020-171067 A) disclose a technique for determining whether a vehicle body resonates based on vibration amplitude of a wheel rotation speed. An automobile disclosed in JP 2018-24278 A includes a filter processing unit that applies a band-pass filter including a resonance frequency region of a vehicle to time series data of a rotation speed, and a determination unit that determines that resonance is occurring when an integrated value of each absolute value of the predetermined number of filter processing values from the filter processing unit is equal to or greater than a first threshold value. In order to protect parts of the vehicle body from vibration, the automobiles disclosed in JP 2018-24278 A and JP 2020-171067 A restrict driving force when it is determined that resonance is occurring.

SUMMARY

When driving force is suddenly reduced significantly, an occupant may feel uncomfortable. The present specification provides a technique for reducing discomfort to the occupant while vibration is suppressed.

A vehicle disclosed in the present specification includes a main motor for traveling and an electronic control unit that controls the main motor. The electronic control unit is configured to extract, from time series data of a rotation speed of the main motor, vibration data in a predetermined frequency band that includes resonance frequency of a drive system that includes the main motor. The electronic control unit is configured to lower an upper limit value of output torque of the main motor from a normal upper limit value to a first upper limit value lower than the normal upper limit value when magnitude of vibration obtained from the extracted vibration data exceeds a first threshold value. Further, the electronic control unit is configured to lower the upper limit value of output torque of the main motor from the first upper limit value to a second upper limit value lower than the first upper limit value when the magnitude of the vibration exceeds a second threshold value larger than the first threshold value.

That is, the electronic control unit lowers the upper limit value of output torque of the main motor by two steps according to the magnitude of the vibration data. When the upper limit value of output torque of the main motor is lowered, vibration can be suppressed. Further, since the upper limit value of output torque of the main motor is lowered by two steps, it is possible to reduce the discomfort to the occupant due to a sudden lowering of the upper limit value of output torque. In addition, when the magnitude of the vibration is reduced by lowering the upper limit value of output torque in the first step (lowering from the normal upper limit value to the first upper limit value), it is not necessary to lower the upper limit value of output torque in the second step (lowering from the first upper limit value to the second upper limit value).

The magnitude of the vibration may be represented by an integrated value or a moving average of a latest amplitude for the predetermined period in the vibration data. Alternatively, the magnitude of the vibration may also be represented by a peak value in a frequency characteristic of the vibration data, or an integrated value of an amplitude in the frequency characteristic. When the integrated value or the moving average of the amplitude for the predetermined period is adopted to measure the magnitude of the vibration, a tendency of the change of the amplitude with time can be accurately grasped. The "amplitude" may be represented by double amplitude (peak to peak) or single amplitude (zero to peak). When the amplitude is measured at single amplitude with positive and negative signs, the integrated value or the moving average of the absolute values of the amplitudes in the vibration data can be adopted.

The vehicle may further include a sub motor for traveling. The sub motor is included in a sub drive system and the sub drive system may have resonance frequency that is included in the predetermined frequency band that includes resonance frequency of the drive system including the main motor. The electronic control unit may be configured to lower the upper limit value of output torque of the main motor from the normal upper limit value to the first upper limit value and lower an upper limit value of output torque of the sub motor from a sub motor normal upper limit value to a sub motor first upper limit value lower than the sub motor normal upper limit value when the magnitude of the vibration exceeds the first threshold value. The electronic control unit may be configured to lower the upper limit value of output torque of the main motor from the first upper limit value to the second upper limit value and lower the upper limit value of output torque of the sub motor from the sub motor first upper limit value to a sub motor second upper limit value lower than the sub motor first upper limit value when the magnitude of the vibration exceeds the second threshold value.

When resonance frequency of the sub motor is close to the resonance frequency of the main motor and the vibration of the drive system including the main motor is large, the vibration of the sub drive system also increases. When the upper limit value of output torque of the sub motor is lowered as well as the upper limit value of output torque of the main motor based on the vibration data of the main motor, the vibration can be effectively suppressed.

The sub motor is included in a sub drive system and the sub drive system may have resonance frequency which is different from the resonance frequency of the drive system including the main motor. The electronic control unit may be configured to, when the magnitude of the vibration of the drive system that includes the main motor exceeds the first threshold value, lower the upper limit value of the output torque of the main motor from the normal upper limit value to the first upper limit value and lower a first ratio of the output torque of the main motor with respect to a target total output torque of the vehicle and increase a second ratio of output torque of the sub motor with respect to the target total output torque of the vehicle.

When the resonance frequency of the sub drive system is away from the resonance frequency of the drive system including the main motor, the vibration of the sub drive system does not increase even when the vibration of the drive system including the main motor is large. When the proportion of output torque of the sub motor with small vibration is increased, it is possible to suppress the vibration of the drive system including the main motor and compensate for a decrease in the output of the main motor.

Details of the techniques disclosed in the present specification and further modifications will be described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
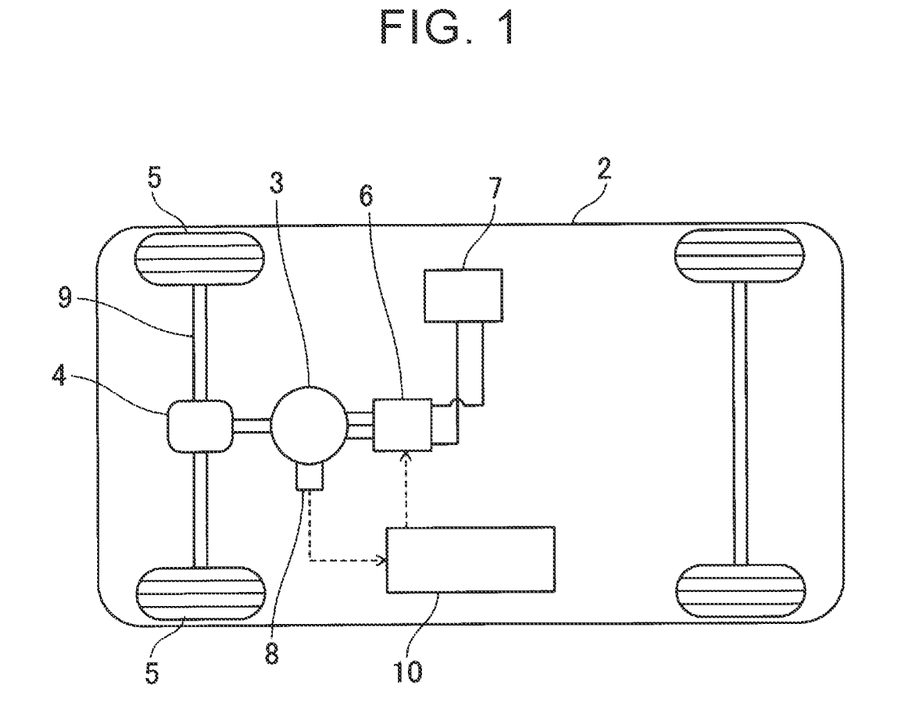
FIG. 1 is a block diagram of a vehicle according to a first embodiment.

A vehicle 2 according to a first embodiment will be described with reference to the drawings. FIG. 1 shows a block diagram of a drive system of the vehicle 2. Dotted arrow lines in FIG. 1 indicate signal lines. The vehicle 2 includes a main motor 3 for traveling. The main motor 3 drives front wheels 5. Output torque of the main motor 3 is transmitted to the front wheels 5 via a front wheel differential gear 4 and a front wheel axle 9.

The vehicle 2 includes an inverter 6, a battery 7, and a controller 10 in addition to the main motor 3. Output power (direct current power) of the battery 7 is converted into alternating current power by the inverter 6, and is supplied to the main motor 3. The inverter 6 is controlled by the controller 10. The main motor 3 is provided with a rotation speed sensor 8 that measures a rotation speed of the main motor 3. Further, a current sensor (not shown) is provided at an alternating current end of the inverter 6. The controller 10 is, for example, an electronic control unit including a processor and a memory, and controls the inverter 6 such that output torque of the main motor 3 follows the target torque based on a measured value of the current sensor and a measured value of the rotation speed sensor 8.

The controller 10 also performs processing of suppressing vibration of the drive system including the main motor 3. Here, the drive system including the main motor 3 includes the main motor 3, a power transmission path (front wheel differential gear 4 and front wheel axle 9) to the drive wheels (front wheels 5) driven by the main motor 3, and a structure that supports the main motor 3 and the power transmission path.

When the vehicle 2 travels, various loads are applied to the vehicle body according to unevenness of a road surface. When frequency of the load applied to the vehicle body is close to resonance frequency of the drive system including the main motor 3, vibration of the drive system increases, and the load applied to the structure of the drive system increases, so that an occupant feels uncomfortable. On the other hand, the vibration received by the vehicle 2 from a road surface appears in measurement data of the rotation speed sensor 8. The controller 10 extracts vibration data in a predetermined frequency band (resonance band) including resonance frequency of the drive system including the main motor 3 from the measurement data (time series data of the rotation speed) of the rotation speed sensor 8. In other words, the controller 10 removes components in bands other than the resonance band from the time series data of the rotation speed, and extracts vibration data in the resonance band. The vibration data in the resonance band can be obtained by applying a band-pass filter to the time series data of the rotation speed. The band-pass filter is set to cause the vibration components in the resonance band to pass and remove vibration components in bands other than the resonance band.

When the frequency of the vibration received from the road surface is close to the resonance frequency of the drive system including the main motor 3, the magnitude of the vibration obtained from the vibration data increases. When the magnitude of the vibration obtained from the vibration data exceeds a first threshold value, the controller 10 lowers an upper limit value of output torque of the main motor 3 from a normal upper limit value to a first upper limit value. The controller 10 restricts output of the inverter 6 such that the output of the main motor 3 does not exceed the set upper limit value of output torque. The upper limit value of output torque of the main motor 3 is lowered, so that it is possible to suppress an increase in the vibration of the drive system including the main motor 3.

Specifically, "the magnitude of the vibration" may refer to an integrated value or a moving average of the latest amplitude for a predetermined period in the vibration data (time series data of the rotation speed obtained after applying the band-pass filter). Alternatively, "the magnitude of the vibration" may refer to a peak value in a frequency characteristic of the vibration data, or an integrated value of the amplitude in the frequency characteristic. The frequency characteristic of the vibration data can be obtained by applying the fast Fourier transform to the vibration data.

In some embodiments, the amplitude obtained from the rotation speed sensor 8 is measured at double amplitude (peak to peak), but may be measured at single amplitude (zero to peak). When the amplitude is measured at single amplitude with positive and negative signs, the integrated value or the moving average of the absolute values of the single amplitude is used as an index for measuring the magnitude of the vibration.

When the magnitude of the vibration exceeds a second threshold value after it exceeds the first threshold value, the controller 10 lowers the upper limit value of output torque to a second upper limit value lower than the first upper limit value. The second threshold value is larger than the first threshold value. That is, the controller 10 lowers the upper limit value of output torque of the main motor 3 by two steps according to the magnitude of the vibration. When the upper limit value of output torque is lowered suddenly and significantly, the occupant may feel uncomfortable. When the upper limit value of output torque of the main motor 3 is lowered by two steps, it is possible to reduce discomfort to the occupant.

Figure 2:
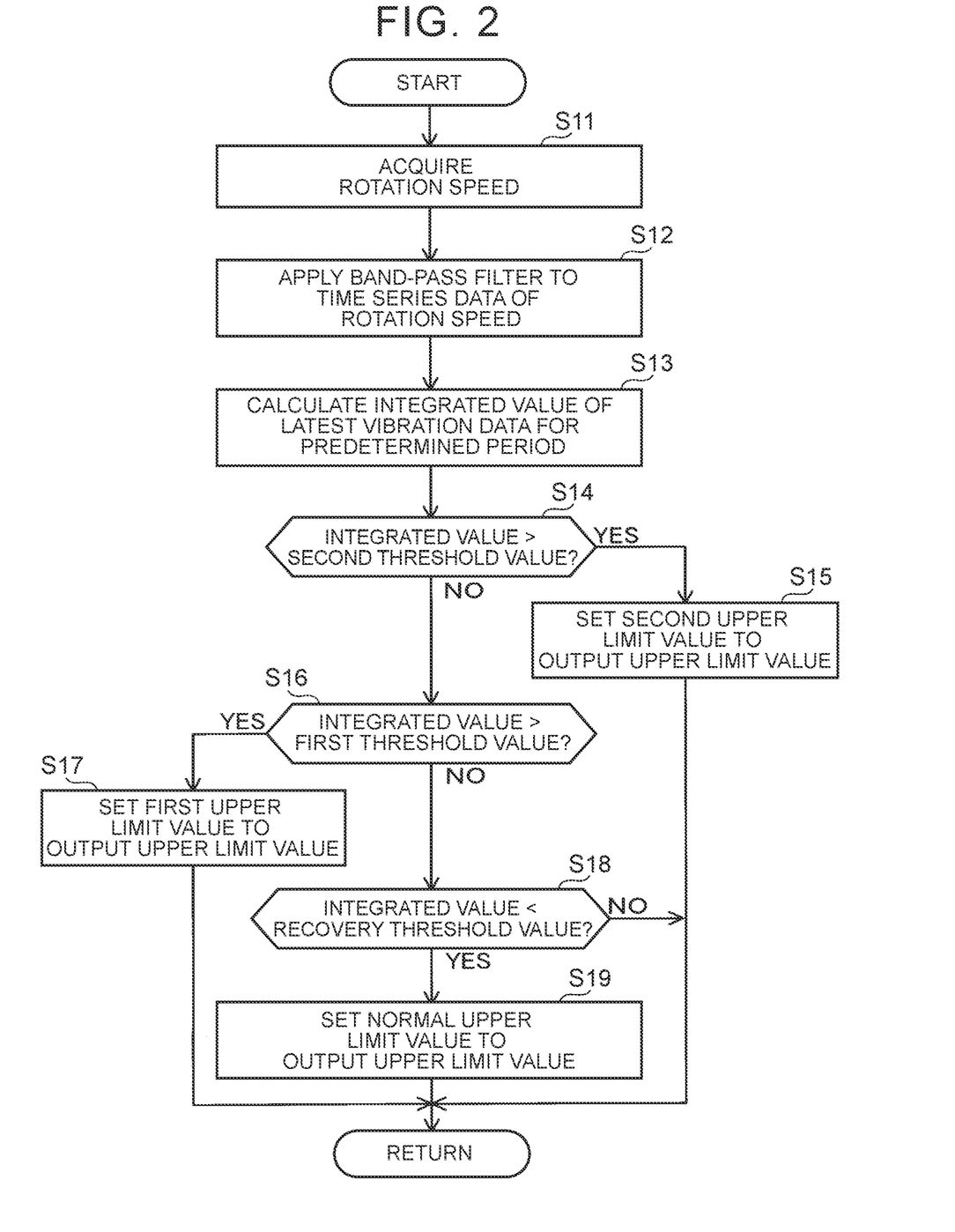
FIG. 2 is a flowchart of output restriction processing executed by a controller.

FIG. 2 shows a flowchart of processing (output restriction processing) executed by the controller 10. The processing executed by the controller 10 will be described with reference to the flowchart shown in FIG. 2.

The controller 10 repeats the processing of FIG. 2 at a certain cycle. First, the controller 10 acquires the rotation speed from the rotation speed sensor 8 (step S11). The controller 10 also stores the rotation speed acquired in the past. That is, the controller 10 acquires time series data of the rotation speed. Each time step S11 is executed, the time series data of the rotation speed is updated to the latest data string.

The controller 10 applies the band-pass filter to the latest time series data of the rotation speed (step S12). The band-pass filter keeps the vibration components in a predetermined frequency band (resonance band) including the resonance frequency of the drive system including the main motor 3, and removes vibration components not in the resonance band. The time series data of the rotation speed obtained after applying the band-pass filter is referred to as vibration data.

Subsequently, the controller 10 calculates the integrated value of the latest vibration data for a predetermined period (step S13). As described above, when the vibration data is represented by single amplitude with positive and negative signs, the controller 10 integrates the absolute value of amplitude data for a predetermined period. The predetermined period can be set as appropriate. The integrated value of the vibration data serves as an index for measuring the magnitude of the vibration.

Subsequently, the controller 10 compares the integrated value with the second threshold value (step S14). The controller 10 compares the integrated value with the first threshold value in step S16 described later. The second threshold value is set to a value larger than the first threshold value.

When the vibration of the drive system including the main motor 3 is large, the integrated value gradually increases as time elapses. Therefore, the determination result in step S16 is YES before the determination result in step S14 is YES. When the determination result in Step S16 is YES (that is, when the integrated value exceeds the first threshold value), the controller 10 changes the upper limit value of output torque of the main motor 3 from the normal upper limit value to the first upper limit value that is lower than the normal upper limit value (Step S16: YES, S17). When the vehicle 2 starts traveling, the upper limit value of output torque of the main motor 3 is usually set to the normal upper limit value.

When the integrated value exceeds the second threshold value (step S14: YES), the controller 10 changes the upper limit value of output torque of the main motor 3 to the second upper limit value (step S15). The second upper limit value is set to a value lower than the first upper limit value.

With the processing in steps S14 to S17, as the integrated value increases, the upper limit value of output torque of the main motor 3 is lowered by two steps from the normal upper limit value to the first upper limit value and further from the first upper limit value to the second upper limit value.

As the vibration of the vehicle body decreases, the integrated value gradually decreases. When the integrated value falls below a recovery threshold value, the controller 10 returns the upper limit value of output torque of the main motor 3 to the normal upper limit value (steps S18: YES, S19). The recovery threshold value is set to a value lower than the first threshold value. The reason for setting the recovery threshold value to be lower than the first threshold value is to prevent the upper limit value of output torque of the main motor 3 from hunting between the normal upper limit value and the first upper limit value in the vicinity of the first threshold value. Instead of setting the recovery threshold value (or in addition to setting the recovery threshold value), the upper limit value of output torque may be returned to the normal upper limit value when the integrated value continuously falls below the first threshold value beyond a predetermined recovery determination period.

Figure 3:
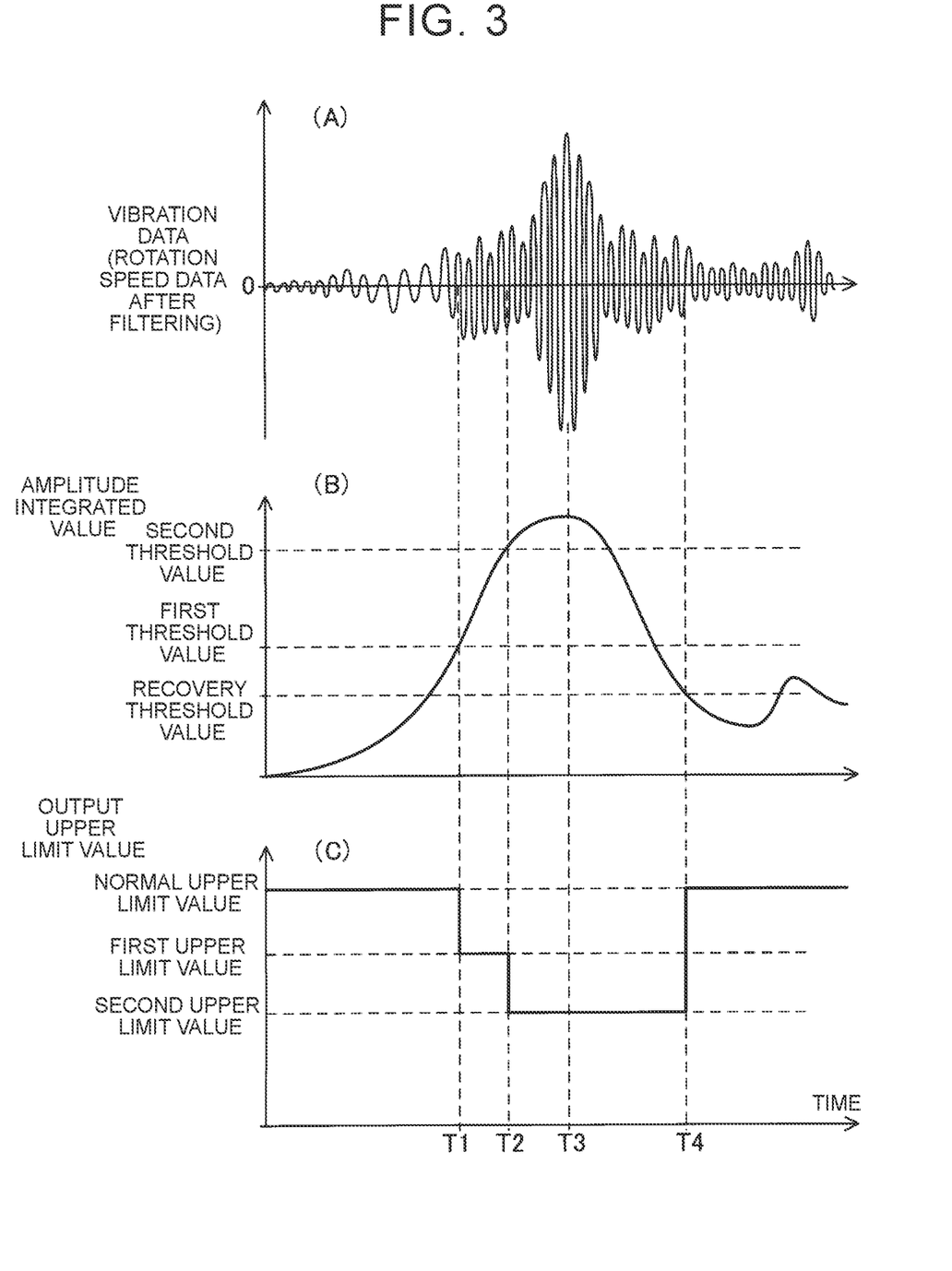
FIG. 3 is an example of time charts of vibration data of a rotation speed, an amplitude integrated value, and an upper limit value of output torque.

FIG. 3 is an example of time charts of vibration data, an amplitude integrated value, and an upper limit value of output torque. Graph (A) in FIG. 3 is a graph of the vibration data. In other words, Graph (A) in FIG. 3 shows the data obtained after applying the band-pass filter to the time series data of the rotation speed. Therefore, the direct current (DC) component is not included in Graph (A) of FIG. 3, and the vertical vibration with reference to zero is shown. As described above, the time series data (vibration data) of the rotation speed obtained after applying the band-pass filter includes only the vibration component in the resonance band.

Graph (B) in FIG. 3 is a graph of the integrated value of the latest amplitude for the predetermined period in the vibration data. Since the integrated value for the predetermined period is shown, the integrated value gradually decreases as the amplitude decreases. Graph (C) in FIG. 3 is a time chart of the upper limit value of output torque of the main motor 3. The upper limit value of output torque of the main motor 3 is initially set to the normal upper limit value.

At time T1, the integrated value of the amplitude in the vibration data exceeds the first threshold value. The controller 10 lowers the upper limit value of output torque of the main motor 3 from the normal upper limit value to the first upper limit value at time T1. At time T2, the integrated value exceeds the second threshold value. The controller 10 lowers the upper limit value of output torque of the main motor 3 from the first upper limit value to the second upper limit value. The second upper limit value is set to a value lower than the first upper limit value.

After time T3, the amplitude gradually decreases and the integrated value also decreases. At time T4, the integrated value falls below the recovery threshold value. The controller 10 returns the upper limit value of output torque of the main motor 3 to the normal upper limit value at time T4.

In the vehicle 2 according to the first embodiment, the upper limit value of output torque of the main motor 3 is lowered by two steps according to the magnitude of the vibration of the drive system including the main motor 3. When the upper limit value of output torque is lowered by two steps, it is possible to suppress the vibration of the drive system and reduce the discomfort to the occupant.

After time T1, when the integrated value decreases before exceeding the second threshold value, and falls below the recovery threshold value, the controller 10 returns the upper limit value of output torque of the main motor 3 from the first upper limit value to the normal upper limit value. Lowering the upper limit value of output torque by two steps according to the magnitude of the vibration has an advantage that it is not necessary to lower the upper limit value of output torque in a second step when the vibration can be suppressed by lowering the upper limit value of output torque in a first step.

Second Embodiment

Figure 4:
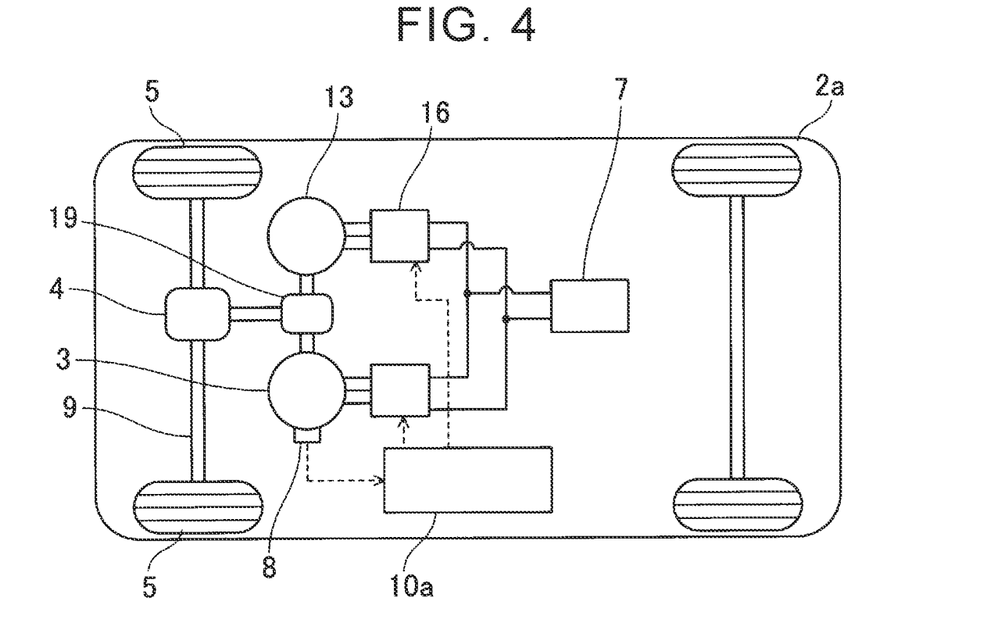
FIG. 4 is a block diagram of a vehicle according to a second embodiment.

FIG. 4 shows a block diagram of a vehicle 2a according to a second embodiment. The vehicle 2a according to the second embodiment includes a sub motor 13 in addition to the main motor 3. The sub motor 13 drives the front wheels 5 together with the main motor 3. Output torque of the sub motor 13 and output torque of the main motor 3 are combined by a gear set 19 and transmitted to the front wheel differential gear 4. A sub inverter 16 converts direct current power of the battery 7 into alternating current power and supplies the converted power to the sub motor 13. A controller 10a controls the inverter 6 and the sub inverter 16.

The sub motor 13 drives the front wheels 5 together with the main motor 3. The sub motor 13 and the main motor 3 are housed in one housing. Therefore, the main motor 3 and the sub motor 13 constitute one drive system. The drive system including the main motor 3 is equal to a drive system including the sub motor 13. Therefore, the resonance frequency of the drive system including the main motor 3 is the same as resonance frequency of the drive system including the sub motor 13. Therefore, when the vibration component of the rotation speed of the main motor 3 increases, a vibration component of the rotation speed of the sub motor 13 also increases.

In a case of the vehicle 2a according to the second embodiment, the controller 10a applies a band-pass filter to the time series data of the rotation speed of the main motor 3 to obtain the vibration data in the resonance band. When the magnitude of the vibration obtained from the vibration data exceeds the first threshold value, the controller 10a lowers the upper limit value of output torque of the main motor 3 from the normal upper limit value to the first upper limit value, and also lowers an upper limit value of output torque of the sub motor 13 (sub motor upper limit value of output torque) from a sub motor normal upper limit value to a sub motor first upper limit value. When the magnitude of the vibration exceeds the second threshold value, the controller 10a lowers the upper limit value of output torque of the main motor 3 to the second upper limit value, and also lowers the sub motor upper limit value of output torque to a sub motor second upper limit value lower than the sub motor first upper limit value. The vehicle 2a according to the second embodiment can also effectively suppress the vibration of the sub motor 13.

The maximum output of the sub motor 13 is equal to or less than the maximum output of the main motor 3, and an influence of the vibration of the sub motor 13 is smaller than an influence of the vibration of the main motor 3. Therefore, when the magnitude of the vibration is measured based on the time series data of the rotation speed of the main motor 3, the vibration of the drive system can be accurately grasped.

Third Embodiment

Figure 5:
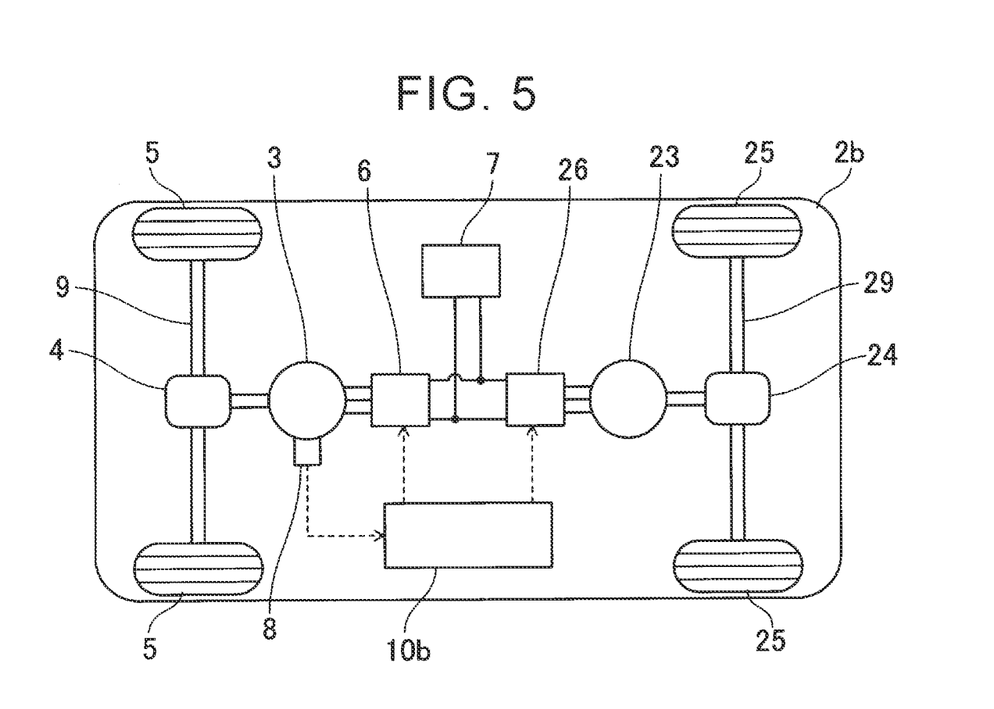
FIG. 5 is a block diagram of a vehicle according to a third embodiment.

FIG. 5 shows a block diagram of a vehicle 2b according to a third embodiment. The vehicle 2b according to the third embodiment also includes a sub motor 23 in addition to the main motor 3. The sub motor 23 drives rear wheels 25. Output torque of the sub motor 23 is transmitted to the rear wheels 25 via a rear wheel differential gear 24 and a rear wheel axle 29. A sub inverter 26 converts direct current power of the battery 7 into alternating current power and supplies the converted power to the sub motor 23. A controller 10b controls the inverter 6 and the sub inverter 26.

The sub motor 23 is disposed at a rear side of the vehicle body and is separated from the main motor 3 disposed at a front side of the vehicle body. A drive system including the sub motor 23 (a sub motor drive system) includes the sub motor 23, a power transmission path (the rear wheel differential gear 24 and the rear wheel axle 29) from the sub motor 23 to the drive wheels (the rear wheels 25), and a structure that supports the sub motor 23 and the power transmission path. Resonance frequency of the sub motor drive system falls out of the resonance band described above (the frequency band including the resonance frequency of the drive system including the main motor 3). Therefore, even when the frequency of the vibration received from the road surface is included in the resonance band and the vibration of the structure of the drive system including the main motor 3 increases, the vibration of the sub motor drive system does not increase.

Therefore, when the magnitude of the vibration obtained from the vibration data of the main motor 3 exceeds the first threshold value, the controller 10b lowers the upper limit value of output torque of the main motor 3 from the normal upper limit value to the first upper limit value, and lowers the ratio of output torque of the main motor 3 with regard to a target total output torque of the vehicle 2b and increases the ratio of output torque of the sub motor 23 with regard to a target total output torque of the vehicle 2b. More strictly, when the magnitude of the vibration obtained from the vibration data of the main motor 3 exceeds the first threshold value, the controller 10b lowers the ratio of output torque of the main motor 3 with regard to a target total output torque of the vehicle 2b such that the ratio of output torque of the main motor 3 with regard to a target total output torque of the vehicle 2b is lower than the ratio of output torque of the main motor 3 with regard to a target total output torque of the vehicle 2b before the magnitude of vibration exceeds the first threshold value. At the same time, the controller 10b increases the ratio of output torque of the sub motor 23 with regard to a target total output torque of the vehicle 2b such that the ratio of output torque of the sub motor 23 with regard to a target total output torque of the vehicle 2b is higher than the ratio of output torque of the sub motor 23 with regard to a target total output torque of the vehicle 2b before the magnitude of the vibration exceeds the first threshold value.

When the upper limit value of output torque of the main motor 3 is lowered to the first upper limit value, the maximum output of the main motor 3 decreases. When a proportion of the output torque of the sub motor 23 is increased, it is possible to make up for the shortage of the output torque of the main motor 3. Since the resonance frequency of the sub motor drive system falls out of the resonance band, when the vibration of the drive system including the main motor 3 increases, the vibration of the drive system including the sub motor 23 does not increase. Even when the proportion of the output torque of the sub motor 23 is increased, the vibration of the entire vehicle body does not increase.

Points to be noted regarding the technique described in the embodiments will be described. As an index indicating the magnitude of the vibration, the moving average of the latest amplitude for a predetermined period in the vibration data may be used. Alternatively, as an index indicating the magnitude of the vibration, the peak value in the frequency characteristic of the vibration data, or the integrated value of the amplitudes in the frequency characteristic may be used. The frequency characteristic of the vibration data can be obtained by applying the fast Fourier transform to the time series data of the rotation speed obtained after applying the band-pass filter. Alternatively, the frequency characteristic of the vibration data can also be obtained by extracting the frequency characteristic in the resonance band after applying the fast Fourier transform to the time series data of the rotation speed. In this case, the band-pass filter becomes unnecessary.

When the integrated value or the moving average of the latest amplitude for the predetermined period is adopted as an index indicating the magnitude of the vibration, a tendency of the change of the amplitude with time can be accurately grasped without focusing on the momentary change of the amplitude. In addition, when the integrated value or the moving average is adopted, the change of the magnitude of the vibration with time becomes gradual. It takes a considerable amount of time for the magnitude of the vibration to exceed the first threshold value and then the second threshold value. It is possible to avoid a situation in which the upper limit value of the output torque is lowered from the normal upper limit value to the second upper limit value in a short period of time. That is, a sudden change in the upper limit value of the output torque can be avoided.

According to the technique disclosed in the present specification, the vibration can be suppressed by lowering the upper limit value of output torque by two steps. The vibration suppression technique disclosed in the present specification is advantageous in terms of mass and cost as compared with a technique of suppressing vibration by adding some parts.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A vehicle comprising:
   a main motor for traveling; and
   an electronic control unit that controls the main motor, the electronic control unit being configured to:
   extract, from time series data of a rotation speed of the main motor, vibration data in a predetermined frequency band that includes resonance frequency of a drive system that includes the main motor;
   lower an upper limit value of output torque of the main motor from a normal upper limit value to a first upper limit value lower than the normal upper limit value when magnitude of vibration obtained from the vibration data exceeds a first threshold value; and
   lower the upper limit value of the output torque of the main motor from the first upper limit value to a second upper limit value lower than the first upper limit value when the magnitude of the vibration exceeds a second threshold value larger than the first threshold value.

2. The vehicle according to claim 1, the vehicle further comprising a sub motor for traveling, the sub motor being included in a sub drive system and the sub drive system having resonance frequency of the sub motor that is included in the predetermined frequency band, wherein the electronic control unit is configured to:
   when the magnitude of the vibration exceeds the first threshold value, lower the upper limit value of the output torque of the main motor from the normal upper limit value to the first upper limit value and lower an upper limit value of output torque of the sub motor from a sub motor normal upper limit value to a sub motor first upper limit value lower than the sub motor normal upper limit value; and
   when the magnitude of the vibration exceeds the second threshold value, lower the upper limit value of the output torque of the main motor from the first upper limit value to the second upper limit value and lower the upper limit value of the output torque of the sub motor from the sub motor first upper limit value to a sub motor second upper limit value lower than the sub motor first upper limit value.

3. The vehicle according to claim 2, wherein a maximum output of the sub motor is equal to or less than a maximum output of the main motor.

4. The vehicle according to claim 1, the vehicle further comprising a sub motor for traveling, the sub motor being included in a sub drive system and the sub drive system having resonance frequency of the sub motor that falls out of the predetermined frequency band, wherein the electronic control unit is configured to, when the magnitude of the vibration exceeds the first threshold value, lower the upper limit value of the output torque of the main motor from the normal upper limit value to the first upper limit value and lower a first ratio of the output torque of the main motor with respect to a target total output torque of the vehicle and increase a second ratio of output torque of the sub motor with respect to the target total output torque of the vehicle.

5. The vehicle according to claim 1, wherein the magnitude of the vibration is represented by an integrated value or a moving average of a latest amplitude for a predetermined period in the vibration data.

6. The vehicle according to claim 1, wherein the magnitude of the vibration is represented by a peak value in a frequency characteristic of the vibration data, or an integrated value of an amplitude in the frequency characteristic.

* * * * *